United States Patent
Nonaka et al.

(10) Patent No.: US 8,138,960 B2
(45) Date of Patent: Mar. 20, 2012

(54) MAP INFORMATION UPDATE SUPPORT DEVICE, MAP INFORMATION UPDATE SUPPORT METHOD AND COMPUTER READABLE RECORDING MEDIUM

(75) Inventors: Takashi Nonaka, Yokohama (JP); Takashi Shibayama, Yokohama (JP); Susumu Takagishi, Yokohama (JP); Tadashi Sasakawa, Kawasaki (JP)

(73) Assignee: Pasco Corporation, Tokyo (JP)

( * ) Notice: Subject to any disclaimer, the term of this patent is extended or adjusted under 35 U.S.C. 154(b) by 106 days.

(21) Appl. No.: 12/309,595

(22) PCT Filed: Jul. 31, 2007

(86) PCT No.: PCT/JP2007/064948
§ 371 (c)(1),
(2), (4) Date: Jan. 23, 2009

(87) PCT Pub. No.: WO2008/016034
PCT Pub. Date: Feb. 7, 2008

(65) Prior Publication Data
US 2009/0289837 A1 Nov. 26, 2009

(30) Foreign Application Priority Data
Aug. 1, 2006 (JP) ................ 2006-210168

(51) Int. Cl.
*G01S 13/90* (2006.01)
(52) U.S. Cl. ........... 342/25 A; 342/25 R; 342/64
(58) Field of Classification Search ........... 342/25 A
See application file for complete search history.

(56) References Cited

U.S. PATENT DOCUMENTS 5,677,693 A * 10/1997 Frankot et al. ............. 342/25 C
(Continued)

FOREIGN PATENT DOCUMENTS

JP    A-2004-294361    10/2004
(Continued)

OTHER PUBLICATIONS

Bailloeul, T.; Duan, J.; Prinet, V.; Serra, B.; , "Urban digital map updating from satellite high resolution images using GIS data as a priori knowledge," 2nd GRSS/ISPRS Joint Workshop on Remote Sensing and Data Fusion over Urban Areas, 2003., pp. 283-287, May 22-23, 2003.*

(Continued)

Primary Examiner — Thomas Tarcza
Assistant Examiner — Matthew M Barker
(74) Attorney, Agent, or Firm — Oliff & Berridge, PLC

(57) ABSTRACT

A map information update support device includes a communication interface unit that acquires plural items of radar image data of the same observation area acquired at different times, respectively, a registration processing unit that registrates the plural items of radar image data with respect to one another, a characteristic value calculation unit that calculates a characteristic value representing a state of a surface of the earth in the observation area using the items of radar image data after the registration process, a feature changed area extraction unit that extracts a feature changed area based on the characteristic value, a road change candidate area extraction unit that synthesizes the feature changed area with map information of the observation area and extracts a road change candidate area that is a candidate of a road changed portion, and an output unit that outputs the map information synthesized with the road change candidate area.

6 Claims, 3 Drawing Sheets

U.S. PATENT DOCUMENTS

| | | | | |
|---|---|---|---|---|
| 5,719,949 | A * | 2/1998 | Koeln et al. | 382/113 |
| 6,243,483 | B1 * | 6/2001 | Petrou et al. | 382/103 |
| 6,466,156 | B1 * | 10/2002 | Ulander | 342/25 R |
| 6,583,751 | B1 * | 6/2003 | Ferretti et al. | 342/25 R |
| 6,650,273 | B1 * | 11/2003 | Obenshain | 342/25 R |
| 7,255,308 | B1 * | 8/2007 | Murphy | 244/158.4 |
| 7,270,299 | B1 * | 9/2007 | Murphy | 244/158.4 |
| 7,528,938 | B2 * | 5/2009 | Garceau et al. | 356/4.01 |
| 7,603,208 | B2 * | 10/2009 | Garceau et al. | 701/3 |
| 2004/0213459 | A1 | 10/2004 | Ishimaru et al. | |
| 2005/0195096 | A1 | 9/2005 | Ward et al. | |
| 2007/0124064 | A1 * | 5/2007 | Fukui et al. | 701/208 |
| 2007/0236366 | A1 * | 10/2007 | Gur et al. | 340/945 |
| 2007/0299338 | A1 * | 12/2007 | Stevick et al. | 600/425 |
| 2008/0158256 | A1 * | 7/2008 | Russell et al. | 345/629 |

FOREIGN PATENT DOCUMENTS

| | | |
|---|---|---|
| JP | A-2005-134601 | 5/2005 |
| JP | A-2005-234603 | 9/2005 |

OTHER PUBLICATIONS

Balz, Timo. "SAR Simulation Based Change Detection with High-Resolution SAR Images in Urban Environments", XXth ISPRS Congress Istanbul 2004. Commission VII, WG4. Jul. 12-23, 2004. 6 pages.*

Dekker, R.J.; , "Texture analysis of urban areas in ERS SAR imagery for map updating ," Remote Sensing and Data Fusion over Urban Areas, IEEE/ISPRS Joint Workshop 2001. pp. 226-230. Nov. 8-9, 2001.*

Stilla et al. "Potential and limits of InSAR data for the reconstruction of buildings". Remote Sensing and Data Fusion over Urban Areas, IEEE/ISPRS Joint Workshop. Nov. 2001. pp. 64-68.*

Hosokawa et al.; "Jiko Soshikika Map ni yoru Polarmetric SAR Data no Tochi Hifuku Bunrui;" *Dai 60 Kai (Heisei 12 Nen Zenki) Zenkoku Taikai Koen Ronbunshu*; Information Processing Society of Japan; Mar. 14, 2000; pp. 2-157 to 2-158 (with English-language abstract).

C. Guang, "Building Identification and Change Detection in Remote Sensing Images," *Information Science and Technology Series*, No. 7, 2005 (with partial translation).

Z. Xiaojie, "Research on Synthetic Aperture Radar Image Change Detection," *Information Science and Technology Series*, No. 1, 2002 (with partial translation).

Dierking et al. "Change detection of small objects and linear features in multi-temporal polarimetric images," Geoscience and Remote Sensing Symposium, 2000. Proceedings. IGARSS 200. IEEE 2000 International 24-28, Jul. 24, 2000. vol. 4, pp. 1693-1695.

Zhiqiang et al. "Update of road network in GIS by fusing multi-sensor imagery," Geoscience and Remote Sensing Symposium, 2005. Proceedings IGARSS 05. IEEE 2005 International Seoul, Korea 25-29, Jul. 25, 2005. vol. 7, pp. 4969-4971.

International Search Report issued Mar. 9, 2011 in European Application No. 07791633.6.

Dec. 13, 2011 Office Action issued in Japanese Patent Application No. 2006-210168 (with translation).

* cited by examiner

MAP INFORMATION UPDATE SUPPORT DEVICE, MAP INFORMATION UPDATE SUPPORT METHOD AND COMPUTER READABLE RECORDING MEDIUM

FIELD OF THE INVENTION

The present invention relates to a map information update support device, a map information update support method and a computer readable recording medium for supporting update of map information.

DESCRIPTION OF THE RELATED ART

In recent years, demand has risen for promptly reflecting information about changes in features such as vegetation and structures on the surface of the earth, particularly changes in roads, in map information accompanying the spread of car navigation systems and the like. Conventionally, such an update operation is performed by visually checking changed portions using optical images and reflecting the changed portions in the map information.

For example, a map information update device, which extracts edges of all features from optical images, compares extracted edges with edges of a previous map, and then updates a map, is disclosed in Japanese Patent Application Laid-Open No. 2005-234603.

However, optical images, which are used in the conventional technique, can only be acquired in clear weather and thus the conventional technique has a problem in that it takes a long time to update the map information. Furthermore, it is difficult to extract all the features by extracting their edges. Besides, obtained map information has to be compared with the previous map in order to update the map, and the conventional technique has a problem in that the accompanying operation is complicated.

SUMMARY OF THE INVENTION

It is an object of the present invention to provide a map information update support device, a map information update support method and a computer readable recording medium capable of efficient operation for updating map information.

To attain the object, according to one aspect of the present invention, there is provided a map information update support device including: a characteristic value calculation part that calculates a predetermined characteristic value for each of items of time-series image data of an observation area that is a surrounding area including an observation target feature, the items of time-series image data being acquired by a radar device at different times, respectively; a feature changed area extraction part that extracts a feature changed area from the observation area based on the predetermined characteristic value; a target change candidate area extraction part that synthesizes the feature changed area with pre-stored map information of the observation area, and extracts a change candidate area of an observation target feature; and an output part that outputs the map information including the change candidate area of the observation target feature.

In the map information update support device, the characteristic value may be one of a scattering coefficient, an index indicating a correlation, and altitude information of the earth's surface.

In the map information update support device, the radar device may be a synthetic aperture radar.

In the map information update support device, the observation target feature may be a road.

Moreover, according to one aspect of the present invention, there is provided a map information update support method including: calculating a predetermined characteristic value for each of items of time-series image data of an observation area that is a surrounding area including an observation target feature, the items of time-series image data being acquired by a radar device at different times, respectively; extracting a feature changed area from the observation area based on the predetermined characteristic value; synthesizing the feature changed area with pre-stored map information of the observation area, and extracting a change candidate area of an observation target feature; and outputting the map information including the change candidate area of the observation target feature.

Moreover, according to one aspect of the present invention, there is provided a computer readable recording medium storing therein a program for causing a computer to perform a process for a map information update support, the process comprising: calculating a predetermined characteristic value for each of items of time-series image data of an observation area that is a surrounding area including an observation target feature, the items of time-series image data being acquired by a radar device at different times, respectively; extracting a feature changed area from the observation area based on the predetermined characteristic value; synthesizing the feature changed area with pre-stored map information of the observation area, and extracting a change candidate area of an observation target feature; and outputting the map information including the change candidate area of the observation target feature.

BRIEF DESCRIPTION OF THE DRAWINGS

Exemplary embodiment(s) of the present invention will be described in detail based on the following figures, wherein.

DESCRIPTION OF THE EXEMPLARY EMBODIMENT

An exemplary embodiment of the present invention (referred to as "an embodiment" below) will be described hereinafter with reference to the drawings. The embodiment will be described below while taking an instance in which an observation target feature is assumed to be a road as an example.

Figure 1:
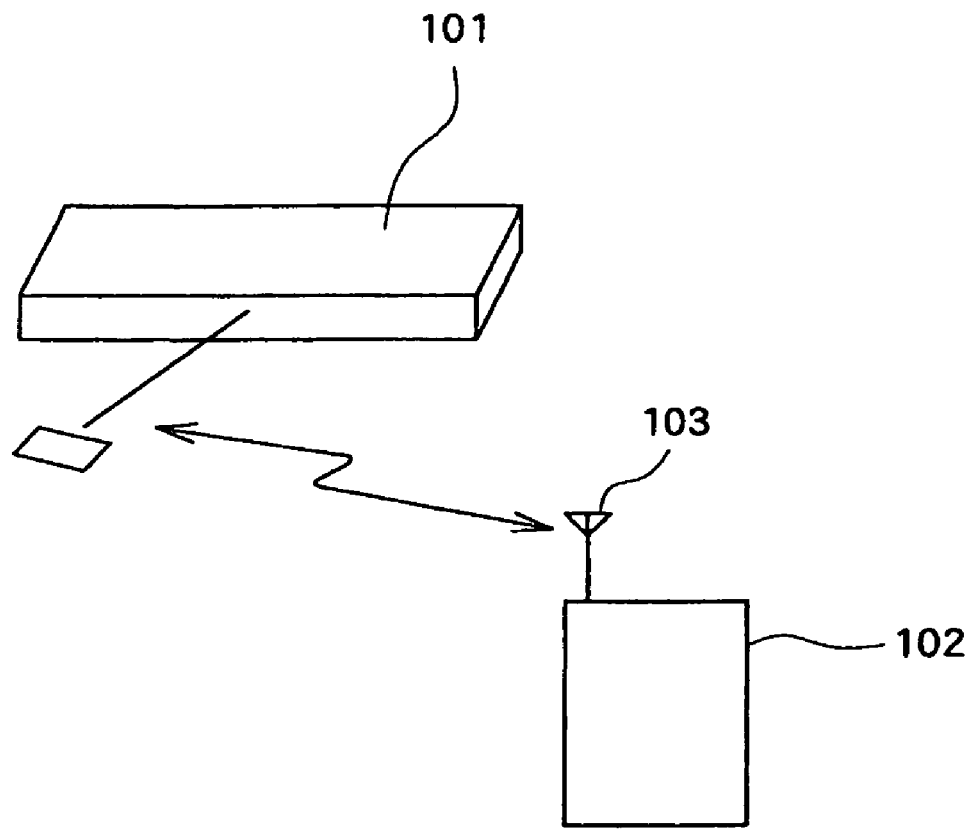
FIG. 1 is a diagram showing an example of a configuration of an extraction system for extracting road change candidate areas in an observation area using a map information update support device according to the present invention.

FIG. 1 shows an example of a configuration of a system for extracting feature changed areas in an observation area. In FIG. 1, a radar device such as a synthetic aperture radar incorporated in an artificial satellite 101 acquires radar image data of the observation area that is a surrounding area including observation target features on the surface of the earth and transmits the radar image data to a map information update support device 102 according to the present embodiment. The map information update support device 102 processes the radar image data received via an antenna 103 to analyze changes in the surface of the earth in the observation area. Here, the radar image data is items of time-series image data acquired by the radar device at different times, respectively. The map information update support device 102 can be realized by, for example, running a predetermined program on a computer.

It is to be noted that the number of artificial satellites 101 is not limited to one, and plural artificial satellites of identical imaging specifications may be used. Further, the radar device may be incorporated in an aircraft instead of the artificial satellite 101.

Figure 2:
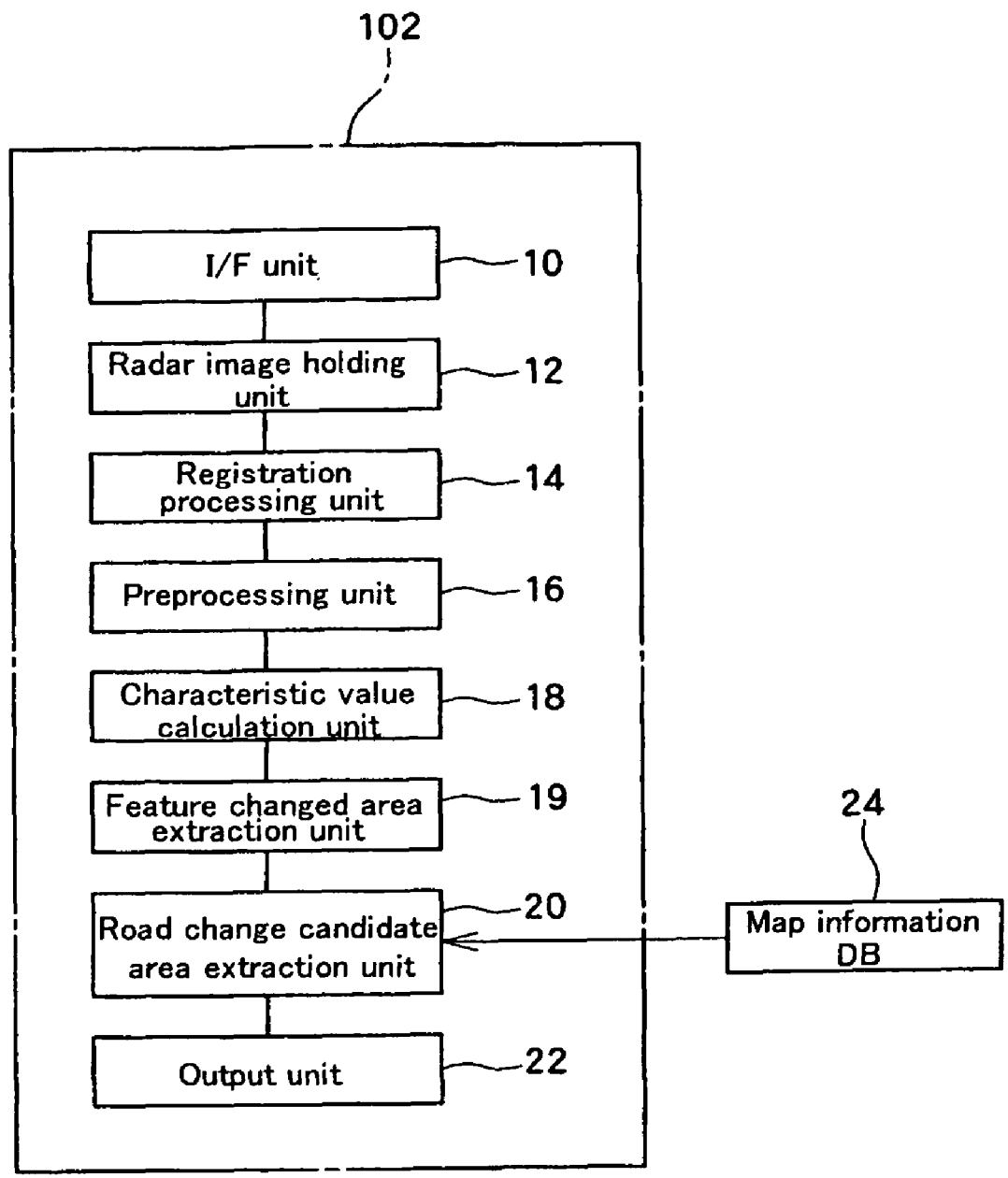
FIG. 2 is a functional block diagram showing an example of a configuration of the map information update support device according to the present invention.

FIG. 2 is a functional block diagram of an example of a configuration of the map information update support device 102 according to the present embodiment. In FIG. 2, the map information update support device 102 is configured to include a communication interface unit 10, a radar image holding unit 12, a registration processing unit 14, a preprocessing unit 16, a characteristic value calculation unit 18, a road change candidate area extraction unit 20 and an output unit 22.

The communication interface unit 10, which is realized by an appropriate communication interface, communicates with the artificial satellite 101 or the like and receives items of time-series image data acquired at different times, each of which including the radar image data, an imaging time and incidence angle data upon imaging.

The radar image holding unit 12, which is realized by a magnetic storage device and the like, holds the radar image data, the imaging times and the incidence angle data received by the communication interface unit 10.

In a forest area or the like, a greater number of radar images may be acquired to grasp changes in characteristic values in detail since the characteristic values change with season. In this case, the number of images to be acquired can be decided based on land cover data stored in a map information database 24 to be described later.

The registration processing unit 14 retrieves plural items of radar image data of the same observation area acquired at different times, respectively from the radar image holding unit 12 and registrates the respective items of radar image data with respect to one another. The registration process is performed since it is necessary for corresponding pixels of the respective items of radar image data to coincide with one another in a characteristic value calculation process to be described later. This registration process can be performed using, for example, a ground control point (GCP). Building distortions may be compensated (orthorectification) at this time.

The preprocessing unit 16 performs filtering processing for removing noise included in the radar image data. In this case, if high resolution SAR data is used, the preprocessing unit 16 may change a pixel size depending on land cover and a scale of the observation area (re-sampling process). Averaging processing or the like, for example, can be used as this filtering processing and the filtering processing may be realized by either hardware or software.

The characteristic value calculation unit 18, which is realized by a central processing unit (CPU) and an operation program, calculates characteristic values representing a state of the surface of the earth in the observation area. The characteristic value is, for example, a scattering coefficient. Alternatively, the characteristic value may be an index (such as coherence) showing correlation between plural items of radar image data of the same observation area respectively acquired at different times or altitude information of the surface of the earth or the like. If plural artificial satellites are used, the height information can be obtained with high accuracy through an interferometry process using the radar device incorporated in each of the satellites.

A feature changed area extraction unit 19, which is realized by the central processing unit (CPU) and the operation program, extracts changed areas in which a state of the surface of the earth changes with time as feature changed areas using the characteristic values calculated by the characteristic value calculation unit 18. If the radar image data acquired by the radar device such as the synthetic aperture radar is used, changes in a road can be grasped from changes in scattering coefficient of, for example, features around the road. This is because scattered electromagnetic waves from a building contain not only a direct scattering component from the building but also plural reflection components between the building and the road. In the present embodiment, using such properties of the radar image data, road change candidate areas are extracted as features around the road changed areas.

If the scattering coefficient is used as a characteristic value, for example, the changed areas (feature changed areas) can be extracted by calculating a difference in scattering coefficient of plural items of radar image data of the same surface of the earth acquired at different times, and determining whether or not the difference is greater than a predetermined threshold value. A target area may be extracted as a changed area based on an extraction condition as to whether or not the number of pixels existing in series, which respectively have differences greater than the predetermined threshold value, is equal to or more than a predetermined number, or whether or not an area represented by pixels, which respectively have difference greater than the predetermined threshold value, is equal to or larger than a predetermined area, for example. The extraction condition may be appropriately set depending on a size (scale) of a map of the surface of the earth in the observation area, a width of each road, a state of the surface of the earth and the like.

Next, the road change candidate extraction unit 20, which is realized by the CPU and the operation program, synthesizes extracted feature changed areas with map information of the observation area and extracts road change candidate areas. The road change candidate extraction unit 20 narrows down the feature changed areas to areas of a high probability of road change based on, for example, knowledge obtained from the map information (such as whether or not the changed area is continuous with an existing road, whether or not the changed area is an extension of the existing road or whether or not the changed area is within a predetermined distance from the road), and then transmits information on the resultant areas to the output unit 22. It is to be noted that the map information of the observation area is retrieved from the map information database 24.

The output unit 22 outputs the map information, which is transmitted from the road change candidate area extraction unit 20 as a result of synthesizing with the road change candidate areas. The output may be a printout, screen display or the like.

Figure 3:
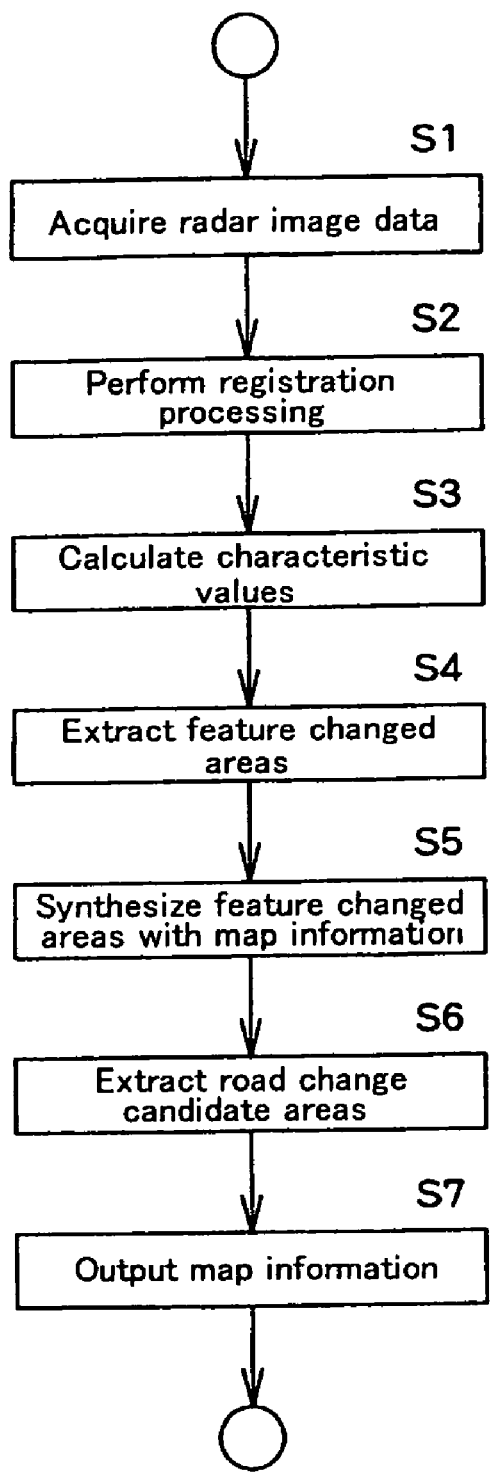
FIG. 3 is a flowchart showing an example of operation performed by the map information update support device according to the present invention.

FIG. 3 shows a flow of an example of operation performed by the map information update support device 102 according to the present embodiment. In FIG. 3, the communication interface unit 10 acquires plural items of radar image data of the same observation area acquired at different times and stores the radar image data in the radar image holding unit 12 (S1). The registration processing unit 14 retrieves the plural items of radar image data from the radar image holding unit 12 and registrates the items of radar image data with respect to one another (S2).

The preprocessing unit 16 removes noise from the registrated radar image data. Next, the characteristic value calculation unit 18 calculates characteristic values representing the state of the surface of the earth in the observation area using the noise-removed radar image data (S3).

The feature changed area extraction unit 19 extracts changed areas, in which the state of the surface of the earth in the observation area changes, as feature changed areas based on the characteristic values (S4).

The road change candidate area extraction unit 20 synthesizes the extracted feature changed areas with the map information of the observation area retrieved from the map information database 24 (S5) and extracts road change candidate areas (S6). The road change candidate area extraction unit 20 extracts, as the road change candidate areas, the areas of high probability of road change from the feature changed areas, based on the knowledge or the like obtained from the map information.

The output unit 22 outputs the synthesized map information output from the road change candidate area extraction unit 20 as screen display, printout or the like (S7).

The road change candidate areas that are candidates of road change portions are shown in the map output as stated above. Therefore, the map can be updated by identifying changed portions based on optical images or field investigation only in the road change candidate areas. This can greatly reduce time and labor required for the map updating operation. In a region where a change in a height of the surface of the earth is small, such as a rural region, road change of a wide road can be extracted only by extracting candidate areas from radar images without using optical images or field investigation. In this case, the radar images may be subjected to an edge extraction process or the like.

Although the exemplary embodiment of the invention has been described above, many changes and modifications will become apparent to those skilled in the art in view of the foregoing description which is intended to be illustrative and not limiting of the invention defined in the appended claims.

The invention claimed is:

1. A map information update support method comprising:
    calculating a scattering coefficient for each item of a plurality of items of time-series image data of an observation area that is a surrounding area including an observation target feature, the items of time-series image data being acquired by a radar device at different times, respectively;
    extracting a feature changed area from said observation area based on scattered electromagnetic waves from buildings around the observation target feature, the scattered electromagnetic waves containing plural reflection components between the buildings and the observation target feature, the extracting the feature changed area further based on an extraction condition including at least (1) one of a number of pixels in series, the pixels having differences in scattering coefficient of plural items of radar image data of the same surface of the earth acquired at different times being greater than a predetermined threshold value, the number of the pixels being equal to or greater than a predetermined number and (2) an area represented by the pixels being equal to or larger than a predetermined area;
    combining said feature changed area with pre-stored map information of the observation area, and extracting a change candidate area of the observation target feature; and
    outputting the map information including said change candidate area of the observation target feature.

2. The map information update support method according to claim 1, further comprising:
    refining the feature changed area to areas of a high probability of a road change based on the map information including at least one of:
        indication of whether or not the feature changed area is continuous with an existing road;
        indication of whether or not the feature changed area is an extension of the existing road; and
        indication of whether or not the feature changed area is within a predetermined distance from the existing road.

3. A non-transitory computer readable recording medium storing therein a program for causing a computer to perform a process for a map information update support, the process comprising:
    calculating a scattering coefficient for each item of a plurality of items of time-series image data of an observation area that is a surrounding area including an observation target feature, the items of time-series image data being acquired by a radar device at different times, respectively;
    extracting a feature changed area from said observation area based on scattered electromagnetic waves from buildings around the observation target feature, the scattered electromagnetic waves containing plural reflection components between the buildings and the observation target feature, the extracting the feature changed area further based on an extraction condition including at least (1) one of a number of pixels in series, the pixels having differences in scattering coefficient of plural items of radar image data of the same surface of the earth acquired at different times being greater than a predetermined threshold value, the number of the pixels being equal to or greater than a predetermined number and (2) an area represented by the pixels being equal to or larger than a predetermined area;
    combining said feature changed area with pre-stored map information of the observation area, and extracting said feature changed area around the observation target feature in the map information as a change candidate area of the observation target feature; and
    outputting the map information including said change candidate area of the observation target feature.

4. The non-transitory computer readable recording medium according to claim 3,
    wherein said radar device is a synthetic aperture radar.

5. The non-transitory computer readable recording medium according to claim 3,
    wherein said observation target feature is a road.

6. The non-transitory computer readable recording medium according to claim 3, further comprising:
    refining the feature changed area to areas of high probability of the observation target feature based on the map information including at least one of:
        indication of whether or not the feature changed area is continuous with the observation target feature;
        indication of whether or not the feature changed area is an extension of the observation target feature; and
        indication of whether or not the feature changed area is within a predetermined distance from the observation target feature.

* * * * *